United States Patent
Cohen et al.

(10) Patent No.: US 11,477,095 B2
(45) Date of Patent: Oct. 18, 2022

(54) DETERMINING A SERVICE IMPACT SCORE FOR A METRIC ACCORDING TO A SCOPE OF THE METRIC

(71) Applicant: VIAVI Solutions Inc., San Jose, CA (US)

(72) Inventors: Steve Cohen, Chanhassen, MN (US); Todd Lange, Eagan, MN (US)

(73) Assignee: VIAVI Solutions Inc., San Jose, CA (US)

( * ) Notice: Subject to any disclaimer, the term of this patent is extended or adjusted under 35 U.S.C. 154(b) by 0 days.

(21) Appl. No.: 16/949,935

(22) Filed: Nov. 20, 2020

(65) Prior Publication Data
US 2021/0160154 A1    May 27, 2021

Related U.S. Application Data

(60) Provisional application No. 62/939,385, filed on Nov. 22, 2019.

(51) Int. Cl.
*H04L 41/5019* (2022.01)
*H04L 43/16* (2022.01)

(52) U.S. Cl.
CPC .......... *H04L 41/5019* (2013.01); *H04L 43/16* (2013.01)

(58) Field of Classification Search
CPC .............................. G06F 11/3466; H04L 43/16
See application file for complete search history.

(56) References Cited

U.S. PATENT DOCUMENTS

| | | | |
|---|---|---|---|
| 9,317,224 B1 * | 4/2016 | Aharoni ................. | G06F 3/0649 |
| 10,382,461 B1 * | 8/2019 | Sharifi Mehr ......  | H04L 63/1425 |
| 10,387,287 B1 * | 8/2019 | Wu .......................  | G06F 11/3024 |
| 2015/0193276 A1 * | 7/2015 | Maclinovsky ........ | G06F 9/5061 |
| | | | 718/104 |
| 2015/0200824 A1 * | 7/2015 | Sadovsky ........... | H04L 41/5009 |
| | | | 709/224 |
| 2017/0034014 A1 * | 2/2017 | Bingham ............. | H04L 41/5032 |
| 2017/0257285 A1 * | 9/2017 | Scholz ................ | H04L 41/5032 |

\* cited by examiner

*Primary Examiner* — Andrew C Georgandellis
(74) *Attorney, Agent, or Firm* — Harrity & Harrity, LLP

(57) ABSTRACT

A scoring platform may obtain a set of measurements associated with a service metric, wherein the service metric is associated with a service of a network. The scoring platform may determine, based on the set of measurements, an aggregation score associated with the service metric. The scoring platform may determine a scope score associated with the set of measurements, wherein the scope score is based on a quantity of units associated with the set of measurements. The scoring platform may determine a service impact score associated with the service metric based on the aggregation score and the scope score, wherein the service impact score is representative of a contributive effect associated with the service metric. The scoring platform may perform an action associated with the service impact score to permit a source of interest associated with the service metric to be detected.

20 Claims, 11 Drawing Sheets

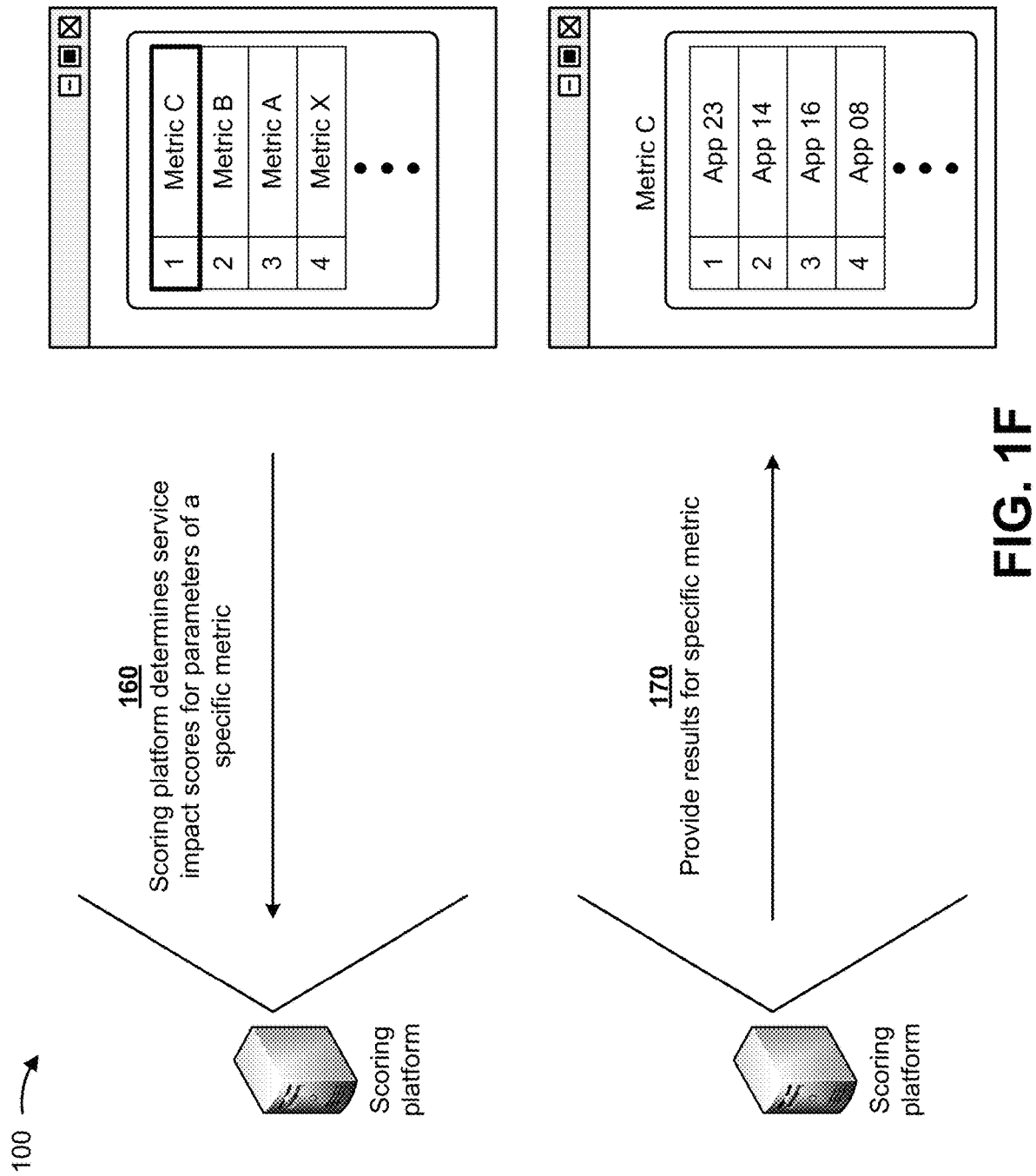

DETERMINING A SERVICE IMPACT SCORE FOR A METRIC ACCORDING TO A SCOPE OF THE METRIC

CROSS-REFERENCE TO RELATED APPLICATION

This patent application claims priority to U.S. Patent Application No. 62/939,385, filed on Nov. 22, 2019, and entitled "DETERMINING A SERVICE IMPACT SCORE FOR A METRIC ACCORDING TO A SCOPE OF THE METRIC." The disclosure of the prior application is considered part of and is incorporated by reference into this patent application.

BACKGROUND

Service monitoring enables monitoring of an impact that a metric of the service is having on a device, an application, and/or a network. Such a metric may be a parameter of the service and/or be associated with one or more devices, networks, or applications of the service. For example, the metric may correspond to a performance of the service, an experience of a client device that receives the service, a performance of a server device and/or application that provides the service, a performance of a network device and/or network that is used to provide the service, and/or the like. Such a service may include a communication service, a network service, a routing service, an application service, a data processing service, a data analytics service, and/or the like.

SUMMARY

According to some implementations, a method may include obtaining a set of measurements associated with a first service metric, wherein the first service metric is associated with a service of a network; determining, based on the set of measurements, an aggregation score associated with the first service metric, wherein the aggregation score is representative of the first service metric in association with a quantity of units; determining, based on the aggregation score satisfying a threshold, a scope score associated with the set of measurements, wherein the scope score is determined based on the quantity of units associated with the set of measurements; determining, based on the aggregation score and the scope score, a service impact score associated with the service metric, wherein the service impact score corresponds to a ranking of the service metric relative to a second service metric associated with the service; and performing an action associated with the service impact score.

According to some implementations, a device may include one or more memories and one or more processors, communicatively coupled to the one or more memories, configured to: receive a first set of measurements associated with a first service metric and a second set of measurements associated with a second service metric, wherein the first service metric and the second service metric are associated with a service of a network, and wherein the first service metric and the second service metric are a same type of service metric; determine a first aggregation score based on the first set of measurements and a second aggregation score based on the second set of measurements, wherein the first aggregation score is associated with the first service metric and the second aggregation score is associated with the second service metric; determine a first scope score based on a first quantity of units associated with the first set of measurements and a second scope score based on a second quantity of units associated with the second set of measurements; determine a first service impact score based on the first aggregation score and the first scope score; determine a second service impact score based on the second aggregation score and the second scope score; determine, based on the first service impact score and the second service impact score, a ranking of the first service metric and the second service metric; and perform, based on the ranking, an action associated with the first service metric or the second service metric.

According to some implementations, a non-transitory computer-readable medium may store one or more instructions. The one or more instructions, when executed by one or more processors of a device, may cause the one or more processors to: obtain a set of measurements associated with a service metric, wherein the service metric is associated with a service of a network; determine, based on the set of measurements, an aggregation score associated with the service metric; determine a scope score associated with the set of measurements, wherein the scope score is based on a quantity of units associated with the set of measurements; determine a service impact score associated with the service metric based on the aggregation score and the scope score, wherein the service impact score is representative of a contributive effect associated with the service metric; and perform an action associated with the service impact score to permit a source of interest associated with the service metric to be detected.

BRIEF DESCRIPTION OF THE DRAWINGS

FIGS. 1A-1F are diagrams of an example implementation described herein.

DETAILED DESCRIPTION

Figure 1A:
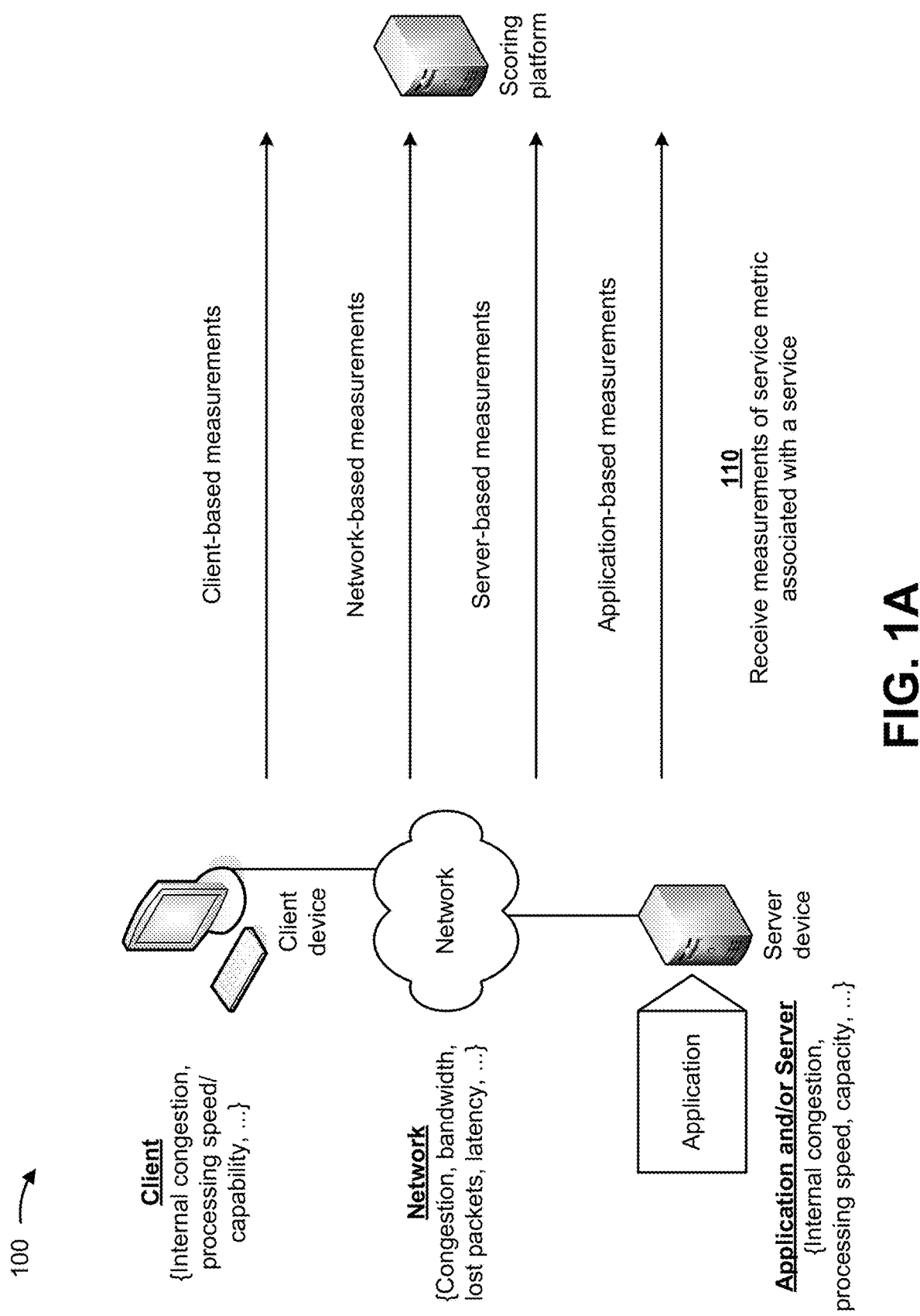

The following detailed description of example implementations refers to the accompanying drawings. The same reference numbers in different drawings may identify the same or similar elements.

In some instances, metrics used to determine a service quality (e.g., based on performance, security, location, device capability, and/or the like) do not provide an accurate indication of a scope of an impact of the metrics. For example, if a metric associated with an end user experience (EUE) of a service has a relatively negative score, but affects relatively few users, the metric will have a lower impact on an overall EUE of the service than a metric with a similar negative score, but that affects a relatively higher quantity of users. Accordingly, without considering the respective scopes of metrics for a service (and/or other objects, groupings, and/or the like), the metrics cannot indicate an overall effect, a relevancy of the metric, and/or provide an accurate indication of a source of interest associated with the service metric (e.g., a source that is a cause of degradation in performance (or other characteristic) of the service).

Some implementations described herein provide a scoring platform that determines a service impact score based on one or more service metrics of a service. The service metrics may correspond to one or more client-based metrics (e.g., client device metrics, EUE metrics, and/or the like), network-based metrics (e.g., network metrics, network device metrics, and/or the like), server-based metrics, application-based metrics, and/or the like. Further, as described herein, the service metrics may include key performance indicators (KPIs) associated with the service, such as data rate (e.g., processing speed), bandwidth, throughput, delay, capacity, congestion, packet-loss, and/or the like. For example, the scoring platform may receive a set of measurements for a service metric of a service, determine an aggregation score for the service metric, determine a scope score for the service metric, and determine a service impact score based on the aggregation score and the scope score. According to some implementations, the scoring platform may determine the scope score based on a quantity of units associated with the aggregation score (e.g., the quantity of units associated with the set of measurements), based on the aggregation score satisfying a threshold (and/or a degree of the aggregation score), and/or the like. As described herein, the scoring platform may rank the service metric for the service relative to other service metrics based on the service impact score (and/or other similarly determined service impact scores for the other service metrics).

In this way, the scoring platform may enable more accurate, more relevant, and/or more accurate monitoring of, and/or detection of, sources of interest associated with the service. Such sources of interest may include one or more devices (e.g., client devices, network devices, server devices, and/or the like) and/or applications associated with a network that are having a relatively negative impact on the network (and/or a service provided via the network). Additionally, or alternatively, the sources of interest may include one or more applications or programs, associated with a device, that are having a relatively negative impact on the device (and/or on a service that is provided and/or received by the device). Accordingly, by enabling the service metrics to be analyzed, indicated, and/or addressed based on the scope of the service metrics (rather than simply by an aggregation score for the service metric), the scoring platform may determine and/or indicate an overall effect that the service metric is having on the service (and/or a network or device associated with the service). In this way, computing resources (e.g., processing resources, memory resources, storage resources, and/or the like) and/or network resources, that may be otherwise wasted on analyzing and/or addressing (e.g., fixing, correcting, improving, and/or the like) service metrics with relatively low or little impact on a service (e.g., due to having a relatively low scope, a relatively minimal negative effect on the service, and/or the like), can be conserved and/or focused on service metrics that have a greater impact on the service (e.g., through adjusting and/or configuring sources of interest associated with the service metrics). In other words, rather than wasting computing resources and/or network resources on addressing service metrics that have a relatively low impact on a service (and/or on a network or device associated with the service), the computing resources and/or network resources can be used to address (e.g., emulate for positive impact, mitigate for negative impact, and/or the like) the service metrics that have the most impact (e.g., the most positive impact, the most negative impact, and/or the like) on the service.

While some examples are described herein with respect to determining a service impact score associated with a service of a network, a service impact score may similarly be determined for any suitable logical grouping and/or set (e.g., resources of a device, devices accessing an application, processes of an application, protocols of a communication session, communication protocols utilized by a device, application protocols utilized by a device, applications operating on a device, and/or the like).

FIGS. 1A-1F are diagrams of an example implementation 100 described herein. As shown in FIG. 1A, a client device may be associated with a network, a server device (e.g., executing an application), and a scoring platform. The client device may communicate with the server device and/or the application, via the network. For example, the client device may receive a service that is provided by the server device and/or application via the network. As described herein, certain events may occur that affect a service metric (e.g., a KPI of a service, a device associated with the service, a location associated with the service, and/or the like), which may impact the service relative to the service metric based on the scope of the service metric. For example, as shown, the client device may experience internal congestion, processing capability reduction (e.g., slowed processing, reduced capacity, and/or the like), and/or the like; the network (and/or one or more network devices of the network) may experience congestion, reduced available bandwidth, packet loss, increased latency, and/or the like; and/or a server (and/or application running on the server) may experience internal congestion, processing capability reduction, and/or the like. As described herein, the scoring platform may analyze an aggregation score of a service metric, determine a scope score of the service metric (e.g., based on a quantity associated with a set of measurements of the service metric), determine an impact score of the service metric based on the aggregation score and the scope score, and perform an action associated with the impact score.

As shown in FIG. 1A, and by reference number 110, the scoring platform receives measurements of a service metric associated with a service. For example, as shown, the scoring platform may obtain sets of client-based measurements (e.g., measurements associated with one or more client devices that receive the service), sets of network-based measurements (e.g., measurements associated with a network used to provide the service), sets of server-based measurements (e.g., measurements associated with one or more server devices that provide the service), and/or sets of application-based measurements (e.g., measurements associated with one or more applications associated with the service). Additionally, or alternatively, one or more of the measurements of example implementation 100 may correspond to and/or be based on a location (e.g., a geographical location and/or region). For example, the location may correspond to a location of a network device of the network (e.g., a location of a base station and/or access point that communicatively couples with the client device). In such cases, the measurements may be used to compare service metrics relative to locations of the network devices and/or client devices.

In some implementations, the type of a service metric may correspond to the types of measurements that are obtained by the scoring platform. For example, a client-based measurement may include a window exhaustion measurement, a bulk data transfer exhausted window measurement, a bulk data transfer time measurement, and/or the like. Such measurements may correspond to and/or be used in determining a client-based metric (e.g., congestion, processing capability, performance, security, and/or the like) associated with the client device. A network-based measurement may include a round trip network delay (RTND) measurement, a connections measurement, a connection establishment failure count measurement, a connection establishment failure time measurement, a connection establishment delay time measurement, a connection establishment delay count measurement, a connection establishment delay SynAckBeforeSyn count measurement, a retransmissions measurement, a data transfer time measurement, a data transfer retransmission time measurement, a data transfer bytes measurement, a retransmitted packets measurement, a total packets measurement, a data packets measurement, network outage indicators, congestion measurements, quality of service (QoS) traffic shaping inputs, service level agreement (SLA) inputs, and/or the like. Such measurements may correspond to and/or be used in determining a network-based metric (e.g., congestion, bandwidth, packet loss, latency, throughput, and/or the like).

A server-based measurement may include a window exhaustion measurement, a bulk data transfer exhausted window measurement, a bulk data transfer time measurement, a connections measurement, a connection establishment failure count measurement, a connection establishment failure time measurement, a connection establishment delay time measurement, a connection establishment delay count measurement, a connection establishment delay SynAckBeforeSyn count measurement, and/or the like. Such measurements may correspond to and/or be used in determining a server-based metric (e.g., congestion, processing capability, performance, security, and/or the like).

An application-based measurement may include an application response time measurement, a total application turn delay measurement (e.g., an application turn may refer to a request/response pair, where for each turn the application must wait the full round trip delay, and the greater the number of turns, the worse the application will perform), a total transaction time measurement, a connections measurement, a high application turn rate measurement, an application RTND total measurement, an application data in-flight measurement, a transfer opportunity delay measurement, and/or the like. Such measurements may correspond to and/or be used in determining an application-based metric (e.g., performance, resource consumption, security, and/or the like). Additionally, or alternatively, one or more of the measurements of example implementation 100 may be combined and/or analyzed in association with other types of service metrics (e.g., location-based metrics, EUE-based metrics, overall service performance metrics, overall service security measurements, and/or the like).

In some implementations, the scoring platform may store hundreds, thousands, millions, or more measurements associated with hundreds, thousands, millions, or more service metrics that may include different values, types of measurements, and/or the like. Furthermore, the scoring platform may process hundreds, thousands, millions, or more sets of measurements in a data structure to permit the service metrics to be monitored (e.g., in real-time) and/or analyzed (e.g., periodically, according to a schedule, according to an event, and/or the like).

In this way, the scoring platform may receive (and/or obtain) a set of measurements associated with a service metric that is associated with receiving and/or providing a service.

Figure 1B:
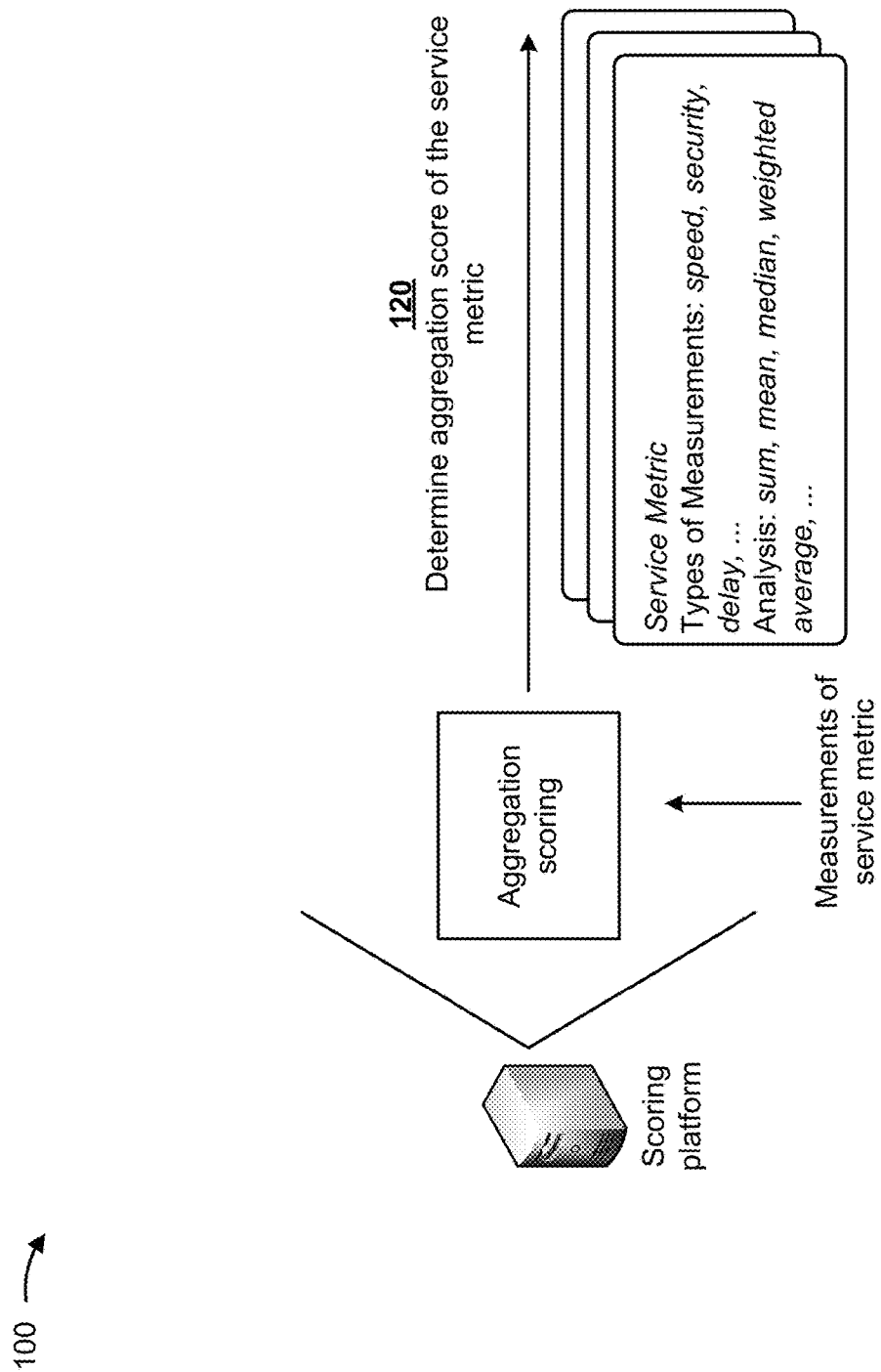

As shown in FIG. 1B, and by reference number 120, the scoring platform determines an aggregation score of the service metric. The aggregation score may be determined based on one or more calculations, analyses, and/or combinations of the set of measurements for the service metric. For example, if the service metric corresponds to an EUE, the aggregation score may correspond to a calculated EUE score for the service that is based on the set of measurements. The EUE score may pertain to an EUE score for any and/or all users affected by and/or associated with client devices and/or network devices used to receive and/or provide the service.

An aggregation score may be determined based on any suitable analysis of the set of measurements and/or may be specific to the type of service metric that is to be analyzed by the scoring platform. In this way, the scoring platform may determine different types of aggregation scores from a same set of measurements depending on the type of service metric that is to be analyzed (e.g., according to scope, as described herein). In some implementations, the scoring platform may use particular parameters of the sets of measurements (e.g., input values used to calculate and/or determine the measurements), timing of the measurements, and/or the like to determine an aggregation score specifically for the service metric. In some implementations, the analysis may include one or more calculations (e.g., summing, subtracting, multiplying, dividing, and/or the like), one or more operations (e.g., comparing, indexing, look-up operations, threshold analyses, and/or the like), to determine and/or analyze the aggregation score. For example, the aggregation score may correspond to an average (e.g., a mean, a median, a mode) of the set of measurements, a weighted average (e.g., using weights corresponding to one or more threshold ranges of the measurements), and/or the like that represents an aggregate score for the service metric based on the set of measurements (e.g., regardless of a scope of the service metric for the set of measurements).

According to some implementations, the aggregation score (e.g., once calculated and/or determined) may be analyzed relative to one or more thresholds (or threshold ranges). For example, the aggregation score may be used to indicate and/or represent a particular performance characteristic of the service metric (e.g., how well the service is being received and/or provided relative to the service metric). In this way, the aggregation score may have a scale and/or ranges that represent whether the service metric is relatively positive (e.g., the service is performing as expected relative to the service metric), relatively negative (e.g., the service is not performing as expected, and/or is underperforming), and/or between relatively positive and relatively negative (e.g., the service is performing satisfactorily but not as expected). In some implementations, the scoring platform may use the thresholds to determine whether the service metric is to be further analyzed (e.g., relative to scope) to permit any sources of interest, that may be causing the service to underperform (relative to the service metric), to be detected and/or addressed.

In this way, the scoring platform may determine an aggregation score associated with a particular service metric of a service to permit the scoring platform to determine and/or indicate a level of performance associated with the service and/or the service metric.

Figure 1C:
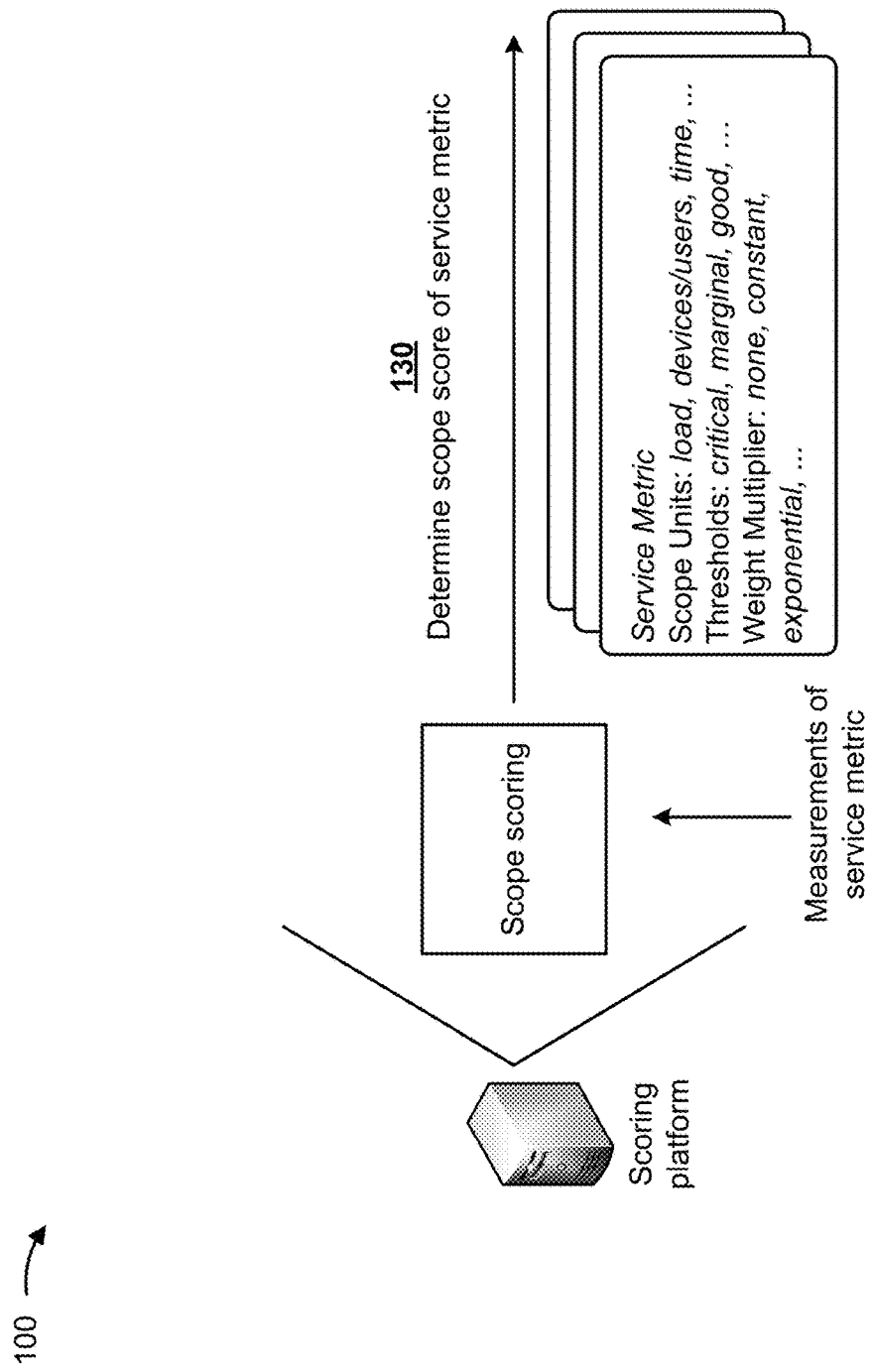

As shown in FIG. 1C, and by reference number 130, the scoring platform determines a scope score of the service metric. According to some implementations, the scope score is based on a scope of the set of measurements. The scope may correspond to a quantity of units that are associated with the set of measurements and that are affected by the service metric and/or that affect the aggregation score, itself. For example, the quantity of units may correspond to the number of measurements in the set of measurements, a number of unique devices (e.g., client devices, network devices, server devices, and/or the like) that are associated with the set of measurements, a number of users associated with the set of measurements, and/or the like. Additionally, or alternatively, the scope (and/or quantity of units) may be associated with a period of time (e.g., the longer the period of time, the greater the scope). In some implementations, the scope score may be determined based on a rate of the set of measurements (e.g., quantity of devices affected, per duration of time). Accordingly, the scope may be determined based on a particular quantity associated with the set of measurements and/or a duration of time associated with the set of measurements.

In some implementations, the scoring platform determines the scope of the service metric based on the aggregation score for the service metric satisfying a threshold. For example, as shown, the scoring platform may use threshold ranges of the aggregation score corresponding to whether the aggregation score indicates that the service metric is in a good condition, a marginal condition, and/or a critical condition. In such a case, if the scoring platform calculates an aggregation score based on the set of measurements that falls within a threshold range associated with a critical condition (e.g., indicating that the service is underperforming relative to the service metric and/or that the aggregation score is relatively negative), the scoring platform may further analyze the set of measurements to determine a scope of the service metric. On the other hand, if the aggregation score indicates that the service metric is in good condition and/or a marginal condition, the scoring platform may not further analyze the set of measurements (e.g., to conserve computing resources associated with determining a scope score for the service metric). Additionally, or alternatively, the scope score may be determined based on a threshold percentage (e.g., 10%, 25%, 50%, and/or the like) of the set of measurements indicating that the set of measurements fall within a threshold range.

In some implementations, the scope score may be determined based on one or more sets of aggregation scores that are determined from the set of measurements. For example, as described herein, the scope scores may be determined and/or weighted based on sets of measurements of the service metric that fall within corresponding threshold ranges for the aggregation scores. Accordingly, an aggregation score may be calculated for first measurements of the set of measurements that correspond to a good condition of the service metric, second measurements of the set of measurements that correspond to a marginal condition of the service metric, and third measurements of the set of measurements that correspond to a critical condition of the service metric. Respective scopes may be determined for the first, second, and third measurements, which may then be used to determine an overall scope of the set of measurements. For example, a greater weight may be given to the scope of the third measurements than the scope of the first measurements (e.g., to put a greater emphasis on a quantity of devices and/or users that are being negatively affected relative to the service metric).

In this way, the scoring platform may determine a scope score associated with the service metric to permit the scoring platform to determine a service impact score that is representative of a contributive effect that the service metric is having on a service of the network.

Figure 1D:
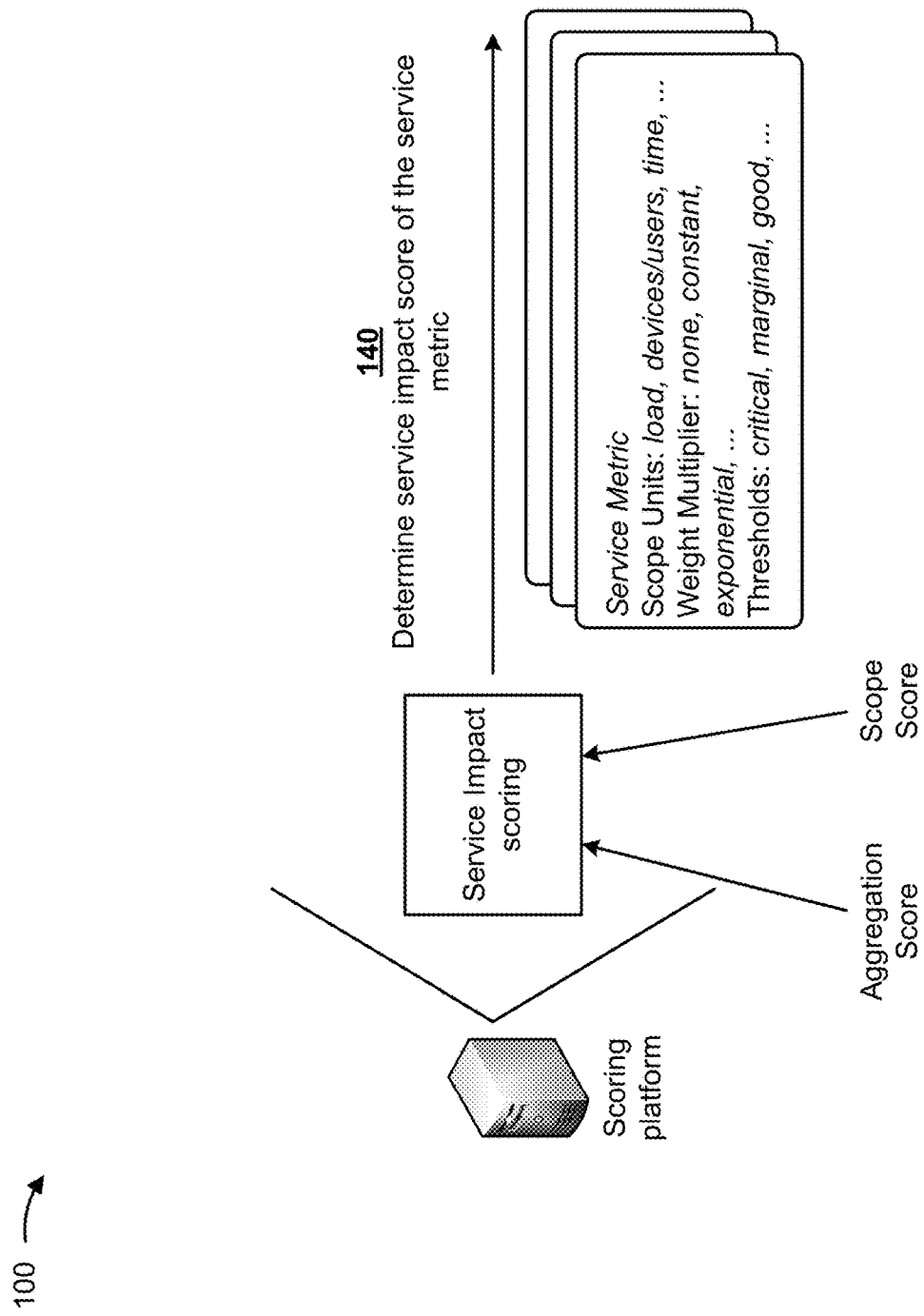

As shown in FIG. 1D, and by reference number 140, the scoring platform determines a service impact score of the service metric. The service impact score may be representative of a contributive effect that the service metric is having on a service. More specifically, the service impact score may indicate an overall effect on the service relative to a performance (e.g., a performance associated with an EUE, security, and/or the like) of the service metric in relation to the scope of the service metric. For example, the scoring platform may determine the service impact score based on the aggregation score and the scope score by weighting the aggregation score using the scope score. In such cases, the greater the scope score, the more emphasis is given to the aggregation score for the service metric and, thereby, the greater the overall impact that the service metric is having on the service (e.g., relative to if the scope score was not considered, and/or relative to other service metrics with respectively lower scope scores).

In some implementations, the service impact score corresponds to a ranking of the service metric relative to a plurality of other service metrics (e.g., the same or similar service metrics) associated with the service. For example, a service impact score may be generated to rank the service metric to permit the contributive effect of the metric to be analyzed relative to other service metrics calculated and/or similarly analyzed for the service. As a more specific example, service impact scores corresponding to EUE scores (e.g., measurements) may be calculated for a plurality of various locations (e.g., as service metrics) of a network to determine which locations have a worse overall EUE, relative to the scope of users at the locations. In this way, locations with relatively low EUE scores, but that are based on a relatively low quantity of users (and/or client devices), may rank lower (e.g., relative to criticality) than locations with relatively higher, but negative, EUE scores that affect a relatively higher quantity of users. Moreover, once identified, service impact scores may similarly be calculated (e.g. using different measurements) for those locations, to identify which service metrics (e.g., service metrics associated with one or more of the client devices, network devices, server devices, applications, and/or the like) for the service are having the greatest impact on the EUE score in the area, to detect sources of interest (e.g., the one or more of the client devices, network devices, server devices, applications, and/or the like) that are having the greatest impact on the EUE in the area.

In some implementations, to rank the service impact scores for the plurality of service metrics, the scoring platform can utilize a service impact scoring system to determine service impact scores associated with service metrics based on characteristics of respective sets of measurements for the service metrics. Using such a scoring system, the scoring platform can apply weights (w) to parameters corresponding to the characteristics of the sets of measurements (e.g., quantity of units, number of users and/or devices associated with the sets of measurements, thresholds of the sets of measurements, durations of time periods associated with the sets of measurements, and/or the like), characteristics of the service metrics (e.g., the type of the service metric, locations of the service metric, and/or the like), and/or the like. Accordingly, the scoring platform can determine (e.g., via one or more calculations associated with the scoring system) scores for a set of service metrics based on the scoring system that are representative of the overall effect that the service metrics are having on a service. For example, the scoring platform can use the following to determine service impact scores ($s_{ij}$) based on three sets of measurements a, b, c of a service i for a network j:

$$s_{ij} = w_{aj}a_i + w_{bj}b_i + w_{cj}c_i + \ldots \quad (1)$$

where $w_{aj}$, $w_{bj}$, $w_{cj}$ correspond to adjusted weights based on the scope (or relevance/impact) to the network/for parameters $a_i$, $b_i$, $c_i$ that correspond to the service metrics of the service i. For example, parameters $a_i$, $b_i$, $c_i$ may include a value (e.g., an aggregation score) associated with a scale for the respective characteristics associated with parameters $a_i$, $b_i$, $c_i$. In some implementations, the adjusted weights $w_{aj}$, $w_{bj}$, $w_{cj}$ may be normalized (e.g., where $0 \leq w_{aj}$, $w_{bj}$, $w_{cj} \leq 1$ and $w_{aj}+w_{bj}+w_{cj}=1$), based on the scope scores of the service metrics (and/or respective sets of measurements a, b, c).

In this way, the scoring platform may determine a service impact score for a service metric, to indicate a contributive effect that the service metric may have on a service and/or to rank the service metric among other service metrics to indicate the contributive effect on the service relative to the other service metrics.

Figure 1E:
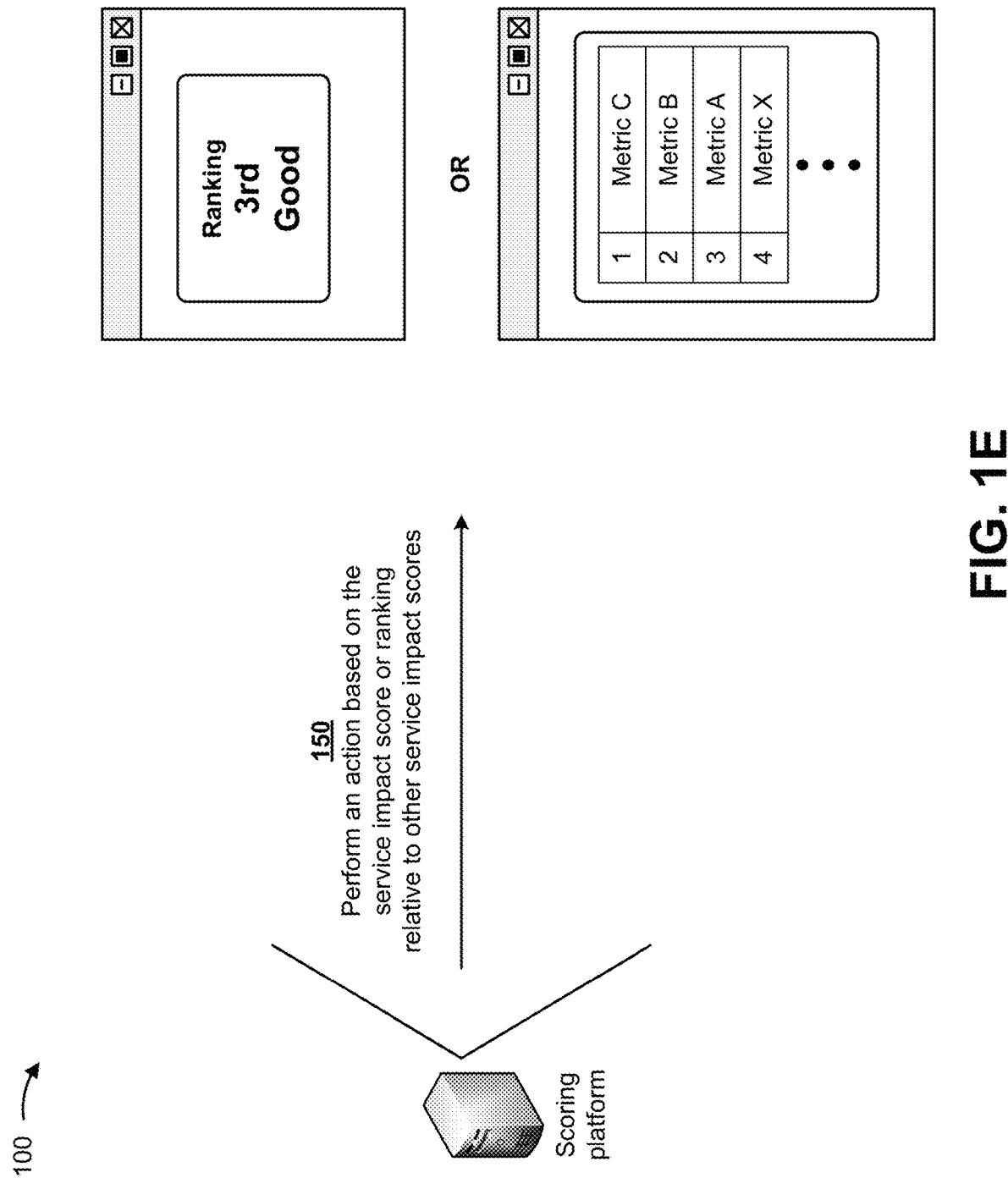

As shown in FIG. 1E, and by reference number 150, the scoring platform performs an action based on the service impact score or ranking relative to other service impact scores. The scoring platform may determine the action based on the service impact score, the aggregation score, the scope score, and/or the like. For example, the scoring platform may determine the action based on the service impact score, aggregation score, scope score, and/or the like satisfying a threshold (and/or having a threshold rank). In some implementations, as shown, the scoring platform may generate information indicating a rank of the service metric relative to other service metrics and/or whether the service impact score is within a particular condition (shown as "good" for a rank of being 3rd in FIG. 1E). Additionally, or alternatively, as shown, the scoring platform may generate information indicating the rank of the service metric and any or all other service metrics that are analyzed by the scoring platform to analyze the service. In this way, in a case where Metric A is the metric determined to rank $3^{rd}$ based on the service impact score, the scoring platform may determine service impact scores for Metric C indicating that Metric C for the service is ranked $1^{st}$, Metric B for the service is ranked $2^{nd}$, and Metric X for the service is ranked $4^{th}$ (along with other possible ranks for other metrics). In this way, the scoring platform may cause a user device to present (e.g., via a display of the user interface) the service impact score and/or the ranking of the service impact score (e.g., so that a user can access the service impact score and/or address any sources of interest associated with the service metric).

In some implementations, the scoring platform may determine one or more other actions that are to be performed based on the service impact score for a particular service metric. For example, the scoring platform may perform an action to permit a source of interest associated with the service metric to be detected. For example, the scoring platform may highlight and/or indicate measurements causing the service impact score to have a relatively high scope and/or causing the most impact on the service impact score (e.g., based on values of sets of measurements and/or frequency of the values of the sets of measurements). More specifically, the scoring platform may indicate which sources (e.g., which measurements, which devices associated with the measurements, which characteristics and/or indicators of the measurements are causing a relatively negative aggregation score to be determined, and/or the like) are causing the service metric to be relatively negative (e.g., which measurements are within a critical range)

According to some implementations, the scoring platform may perform an action associated with the service to address sources of interest that have the greatest impact on the service impact score. For example, based on the scope score and/or measurements falling within particular thresholds, the scoring platform may indicate the sources associated with the measurements and/or scope score, to permit a control device (and/or a user) to perform one or more operations to alter the performance of the sources. In some implementations, the sources may be associated with a service metric that is ranked lower than another service metric. In such cases, the scoring platform may perform the action to reduce a difference between the service impact scores of the two service metrics (e.g., to achieve balanced performance associated with the service metrics). For example, the scoring platform may indicate that one or more operations should be performed in association with one or more of the client device, the server device, a network device of the network, and/or the application so that the aggregation score is modified (e.g., by causing measurements associated with the sources to be improved), the scope score is modified (e.g., by reallocating resources and/or reconfiguring units affecting the scope score), and/or so that the service impact score is modified (e.g., improved by adjusting the aggregation score and/or scope score).

Accordingly, the scoring platform may perform one or more actions associated with the service impact score to permit a source of interest associated with a service metric of the service to be identified and/or to enable an analysis of the service to be performed.

As shown in FIG. 1F, and by reference number 160, the scoring platform determines a service impact score for submetrics of a specific service metric. For example, the scoring platform may similarly perform one or more processes described herein to determine service impact scores for respective submetrics (e.g., parameters) that are specific to a set of metrics (e.g., a threshold quantity of metrics) that received relatively high service impact scores (e.g., a top three, a top five, a top ten, and/or the like) as described herein. Accordingly, similar to the above, for each submetric (or class of submetrics) the scoring platform may determine an aggregation score, a scope score, and/or the service impact score (based on the aggregation score and the scope score).

In some implementations, the scoring platform may determine the service impact scores for submetrics of a particular metric based on a user input. For example, a user, via a user interface, may select one or more of the ranked service metrics above to cause the scoring platform to determine and/or rank the submetrics of the selected service metric. In this way, the user may be able to further investigate a cause for the service metric receiving a relatively high service impact score (e.g., and/or a cause of a degradation of a service due to the relatively high service impact score for the service metric).

As an example, if the service metric corresponds to a particular KPI of a network service (e.g., because the specific KPI has a relatively high service impact score), the scoring platform may analyze submetrics associated with the KPI. Such submetrics may correspond to particular applications contributing to the KPI (e.g., applications utilizing the network service), locations contributing to the KPI (e.g., locations and/or areas of network devices of the network service), devices (e.g., server devices, client devices, and/or the like) contributing to the KPI, and/or the like. In this way, the scoring platform may rank the submetrics according to the submetrics contributing to the KPI, using the service impact score (based on aggregation scores and/or scope scores for the submetrics) for the submetrics.

In this way, the scoring platform may determine a service impact score for submetrics of the one or more metrics. Accordingly, the scoring platform may perform more granular monitoring and/or detection of sources of interest associated with a service, by correspondingly analyzing submetrics of a particular metric (e.g., a metric that received a relatively high service impact score).

As further shown in FIG. 1F, and by reference number 170, the scoring platform may provide results for the specific metric. In example implementation 100, applications may be ranked for Metric C according to the service impact scores calculated relative to Metric C. Accordingly, assuming Metric C corresponds to a KPI of a network based service, applications that have a strongest impact on that KPI may be ranked as shown (e.g., where "App 23" has the most impact relative to "App 14," "App 16," "App 08" or any other applications).

In this way, through a subsequent iteration, that is service metric specific, the scoring platform may indicate a more granular service impact score for a particular service metric based on service impact scores for submetrics of the service metric.

Accordingly, some implementations described herein address one or more issues associated with determining a service impact score for a service metric of a service and/or ranking service metrics based on contributive effects that the service metrics may have on the service. Implementations described herein may provide a uniform scoring system that enables the service metrics to be easily analyzed, easily understood, and/or the like, to permit sources of interest associated with the service metrics to be addressed, to improve and/or alter a performance associated with the service metrics. Moreover, implementations described herein provide a scoring system that can be adapted to be applied to various domains based on particular needs and/or desires with respect to monitoring and/or analyzing the domains.

Accordingly, several different stages of a process for determining a service impact score and/or ranking of service metrics may remove human subjectivity and waste from the process, may improve speed and efficiency of the process, and may conserve computing resources (e.g., processor resources, memory resources, and/or the like) and/or network resources associated with the process. For example, receiving sets of measurements for a service metric, determining an aggregation score for the service metric, determining a scope score for the service metric, and determining a service impact score based on the aggregation score and the scope score, and/or ranking service metrics based on the service impact score, as described herein, may conserve computing resources (e.g., processor resources, memory resources, and/or the like) and/or network resources that would otherwise be wasted in attempting to analyze and/or monitor the service metrics based on aggregation scores, which may not provide an accurate or relevant indication that the service metric has on a particular service.

As indicated above, FIGS. 1A-1F are provided merely as one or more examples. Other examples may differ from what is described with regard to FIGS. 1A-1F.

Figure 2:
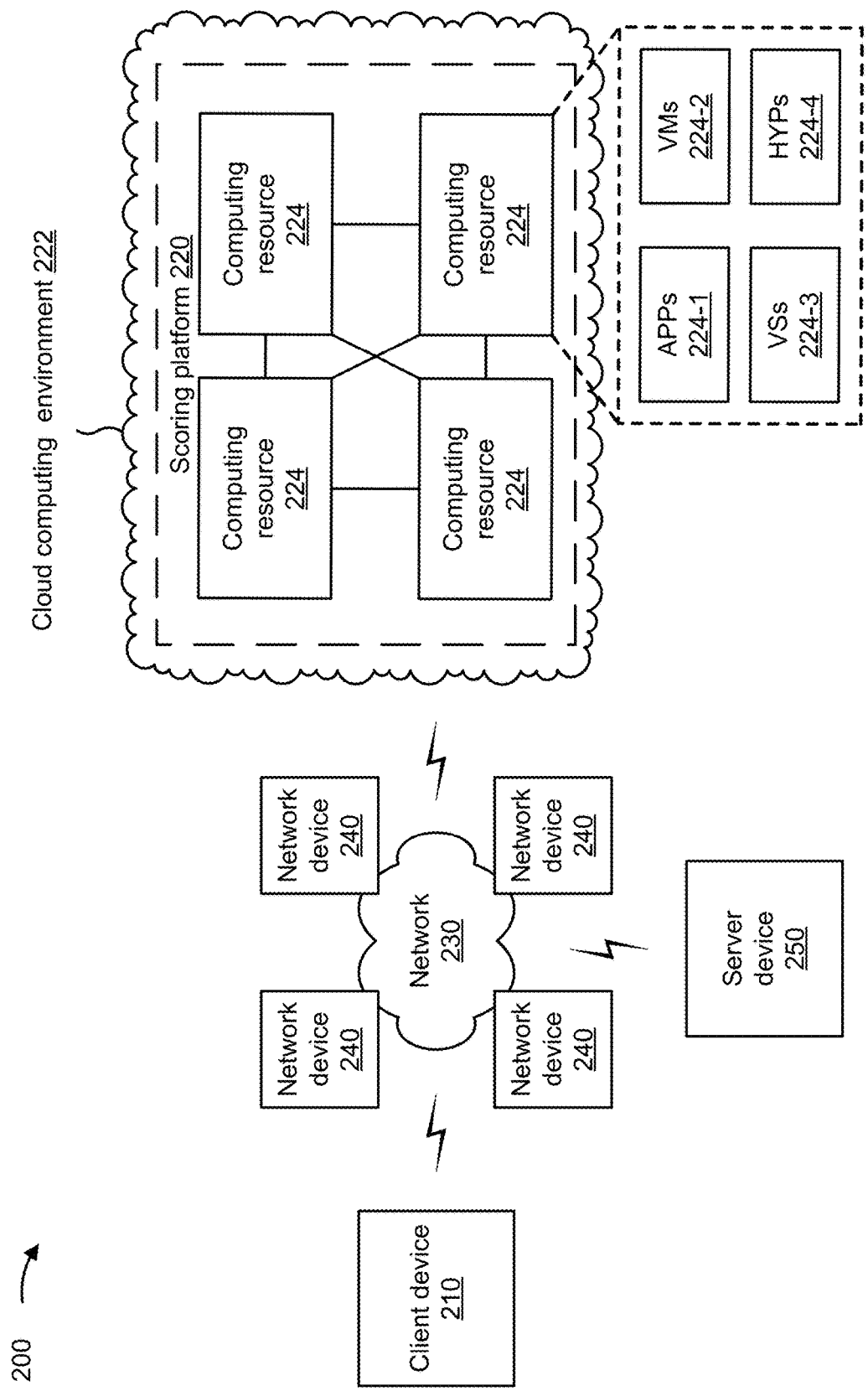
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a client device 210, a scoring platform 220, a cloud computing environment 222, a computing resource 224, a network 230, one or more network devices (referred to herein individually as "network device 240" and collectively as "network devices 240") and a server device 250. Devices of environment 200 may interconnect via wired connections, wireless connections, or a combination of wired and wireless connections.

Client device 210 includes one or more devices capable of receiving, generating, storing, processing, and/or providing information associated with determining a service impact score for a metric according to a scope of the metric. For example, client device 210 may include a communication and/or computing device, such as a mobile phone (e.g., a smart phone, a radiotelephone, and/or the like), a laptop computer, a tablet computer, a handheld computer, a desktop computer, a gaming device, a wearable communication device (e.g., a smart wristwatch, a pair of smart eyeglasses, and/or the like), or a similar type of device.

Scoring platform 220 includes one or more computing resources configured to determine a service impact score for a metric according to a scope of the metric. For example, scoring platform 220 may be a platform implemented by cloud computing environment 222 that may receive sets of measurements for a service metric, determine an aggregation score for the service metric, determine a scope score for the service metric, and determine a service impact score based on the aggregation score and the scope score, and/or rank service metrics based on the service impact score, as described herein. In some implementations, scoring platform 220 is implemented by computing resources 224 of cloud computing environment 222.

Scoring platform 220 may include a server device or a group of server devices. In some implementations, scoring platform 220 may be hosted in cloud computing environment 222. Notably, while implementations described herein may describe scoring platform 220 as being hosted in cloud computing environment 222, in some implementations scoring platform 220 may be non-cloud-based or may be partially cloud-based.

Cloud computing environment 222 includes an environment that delivers computing as a service, whereby shared resources, services, and/or the like may be provided to client device 210, server device 250, and/or the like. Cloud computing environment 222 may provide computation, software, data access, storage, and/or other services that do not require end-user knowledge of a physical location and configuration of a system and/or a device that delivers the services. As shown, cloud computing environment 222 may include scoring platform 220 and computing resource 224.

Computing resource 224 includes one or more personal computers, workstation computers, server devices, or another type of computation and/or communication device. In some implementations, computing resource 224 may host scoring platform 220. The cloud resources may include compute instances executing in computing resource 224, storage devices provided in computing resource 224, data transfer devices provided by computing resource 224, and/or the like. In some implementations, computing resource 224 may communicate with other computing resources 224 via wired connections, wireless connections, or a combination of wired and wireless connections.

As further shown in FIG. 2, computing resource 224 may include a group of cloud resources, such as one or more applications ("APPs") 224-1, one or more virtual machines ("VMs") 224-2, virtualized storage ("VSs") 224-3, one or more hypervisors ("HYPs") 224-4, or the like.

Application 224-1 includes one or more software applications that may be provided to or accessed by client device 210. Application 224-1 may eliminate a need to install and execute the software applications on client device 210. For example, application 224-1 may include software associated with scoring platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program and may support a single process. In some implementations, virtual machine 224-2 may execute on behalf of a user (e.g., a user of client device 210, a user of server device 250, and/or the like), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 provides hardware virtualization techniques that allow multiple operating systems (e.g., "guest operating systems") to execute concurrently on a host computer, such as computing resource 224. Hypervisor 224-4 may present a virtual operating platform to the guest operating systems and may manage the execution of the guest operating systems. Multiple instances of a variety of operating systems may share virtualized hardware resources.

Network 230 includes one or more wired and/or wireless networks. For example, network 230 may include a cellular network (e.g., a long-term evolution (LTE) network, a code division multiple access (CDMA) network, a 3G network, a 4G network, a 5G network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks. Network 230 may be used to provide a service (e.g., a communication service, an application service, a network service, a data service, and/or the like) of server device 250 (and/or an application running on server device 250).

Network device 240 includes one or more devices (e.g., one or more traffic transfer devices) capable of processing and/or transferring traffic between client device 210, scoring platform 220, and/or server device 250. For example, network device 240 may include a firewall, a router, a gateway, a switch, a hub, a bridge, a reverse proxy, a server (e.g., a proxy server), a security device, an intrusion detection device, a load balancer, or a similar device. Network device 240 may be used to provide a service of server device 250.

Server device 250 includes one or more devices capable of storing, processing, and/or routing information associated with providing a service (e.g., to client device 210), running an application associated with a service, performing a service, and/or the like. In some implementations, server device 250 may include a communication interface that allows server device 250 to receive information from and/or transmit information to other devices in environment 200.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
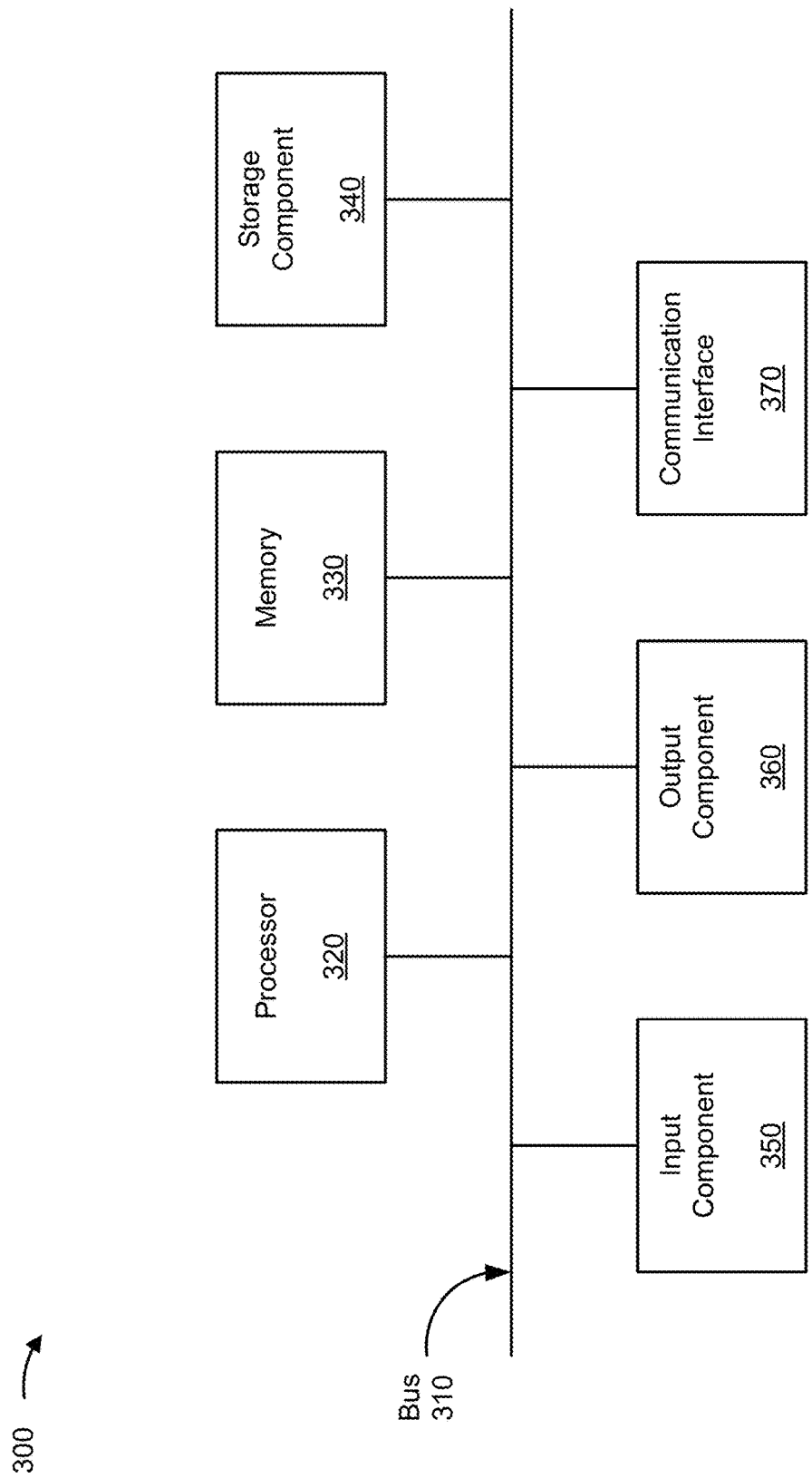
FIG. 3 is a diagram of example components of one or more devices of FIG. 2.

FIG. 3 is a diagram of example components of a device 300. Device 300 may correspond to client device 210, scoring platform 220, computing resource 224, and/or server device 250. In some implementations, client device 210, scoring platform 220, computing resource 224, and/or server device 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid-state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
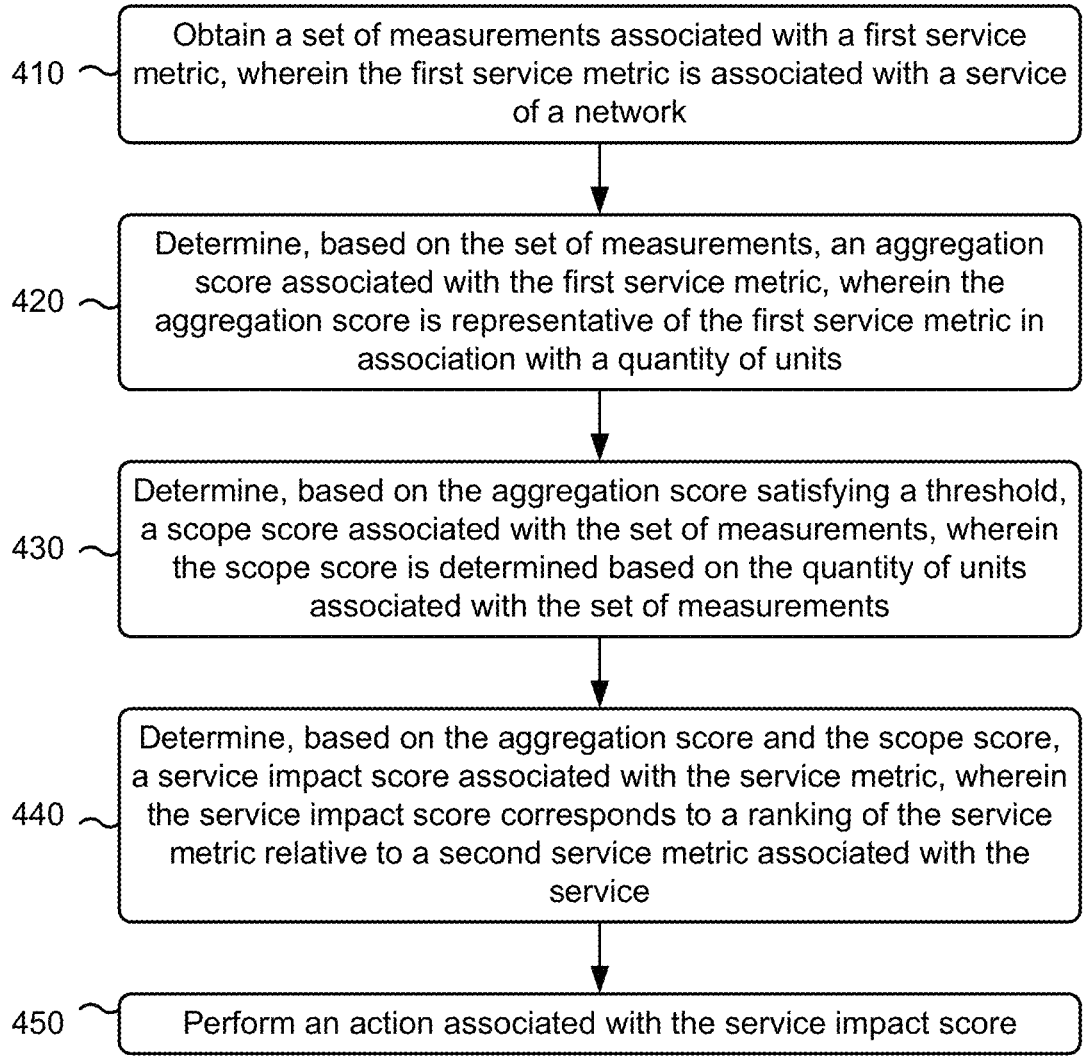
FIGS. 4-6 are flowcharts of example processes for determining a service impact score for a metric according to a scope of the metric.

FIG. 4 is a flowchart of an example process 400 for determining a service impact score for a metric according to a scope of the metric. In some implementations, one or more process blocks of FIG. 4 may be performed by a scoring platform (e.g., scoring platform 220). In some implementations, one or more process blocks of FIG. 4 may be performed by another device or a group of devices separate from or including the scoring platform, such as a client device (e.g., client device 210), a network device (e.g., network device 240), a server device (e.g., server device 250), and/or the like.

As shown in FIG. 4, process 400 may include obtaining a set of measurements associated with a first service metric, wherein the first service metric is associated with a service of a network (block 410). For example, the scoring platform (e.g., using processor 320, memory 330, storage component 340, input component 350, output component 360, communication interface 370 and/or the like) may obtain a set of measurements associated with a first service metric, as described above. In some implementations, the first service metric is associated with a service of a network.

As further shown in FIG. 4, process 400 may include determining, based on the set of measurements, an aggregation score associated with the first service metric, wherein the aggregation score is representative of the first service metric in association with a quantity of units (block 420). For example, the scoring platform (e.g., using processor 320, memory 330, storage component 340, input component 350, output component 360, communication interface 370 and/or the like) may determine, based on the set of measurements, an aggregation score associated with the first service metric, as described above. In some implementations, the aggregation score is representative of the first service metric in association with a quantity of units.

As further shown in FIG. 4, process 400 may include determining, based on the aggregation score satisfying a threshold, a scope score associated with the set of measurements, wherein the scope score is determined based on the quantity of units associated with the set of measurements (block 430). For example, the scoring platform (e.g., using processor 320, memory 330, storage component 340, input component 350, output component 360, communication interface 370 and/or the like) may determine, based on the aggregation score satisfying a threshold, a scope score associated with the set of measurements, as described above. In some implementations, the scope score is determined based on the quantity of units associated with the set of measurements.

As further shown in FIG. 4, process 400 may include determining, based on the aggregation score and the scope score, a service impact score associated with the service metric, wherein the service impact score corresponds to a ranking of the service metric relative to a second service metric associated with the service (block 440). For example, the scoring platform (e.g., using processor 320, memory 330, storage component 340, input component 350, output component 360, communication interface 370 and/or the like) may determine, based on the aggregation score and the scope score, a service impact score associated with the service metric, as described above. In some implementations, the service impact score corresponds to a ranking of the service metric relative to a second service metric associated with the service.

As further shown in FIG. 4, process 400 may include performing an action associated with the service impact score (block 450). For example, the scoring platform (e.g., using processor 320, memory 330, storage component 340, input component 350, output component 360, communication interface 370 and/or the like) may perform an action associated with the service impact score, as described above.

Process 400 may include additional implementations, such as any single implementation or any combination of implementations described below and/or in connection with one or more other processes described elsewhere herein.

In a first implementation, the aggregation score is a first aggregation score, the scope score is a first scope score, and the service impact score is associated with a first network device of the network, wherein the service impact score is determined based on normalizing the first aggregation score and a second aggregation score based on the first scope score and a second scope score, wherein the second aggregation score and the second scope score are associated with the second service metric, and wherein the second service metric is associated with a second network device of the network that is different from the first network device.

In a second implementation, alone or in combination with the first implementation, a type of the first service metric and the second service metric corresponds to at least one of: a network-based metric associated with the network, a client-based metric associated with a client device that receives the service, a server-based metric associated with a server device that provides the service, an application-based metric associated with an application that provides the service, or a location-based metric associated with a location of receiving the service or a location of providing the service.

In a third implementation, alone or in combination with one or more of the first and second implementations, the aggregation score is determined based on an analysis for the type of service metric of the first service metric and the second service metric.

In a fourth implementation, alone or in combination with one or more of the first through third implementations, the aggregation score satisfying the threshold corresponds to the first service metric having a negative performance characteristic.

In a fifth implementation, alone or in combination with one or more of the first through fourth implementations, the service impact score indicates a contributive effect of the service being provided or received via the network relative to the second service metric.

In a sixth implementation, alone or in combination with one or more of the first through fifth implementations, performing the action comprises performing an action associated with at least one of: a client device that receives the service, a server device that provides the service, or a network used in association with the service, the action modifying at least one of: the aggregation score, the scope score, or the service impact score.

In a seventh implementation, alone or in combination with one or more of the first through sixth implementations, performing the action comprises at least one of: causing a user interface to indicate the service impact score, or indicating, via a user interface, the service impact score relative to other service impact scores for other service metrics associated with the service.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
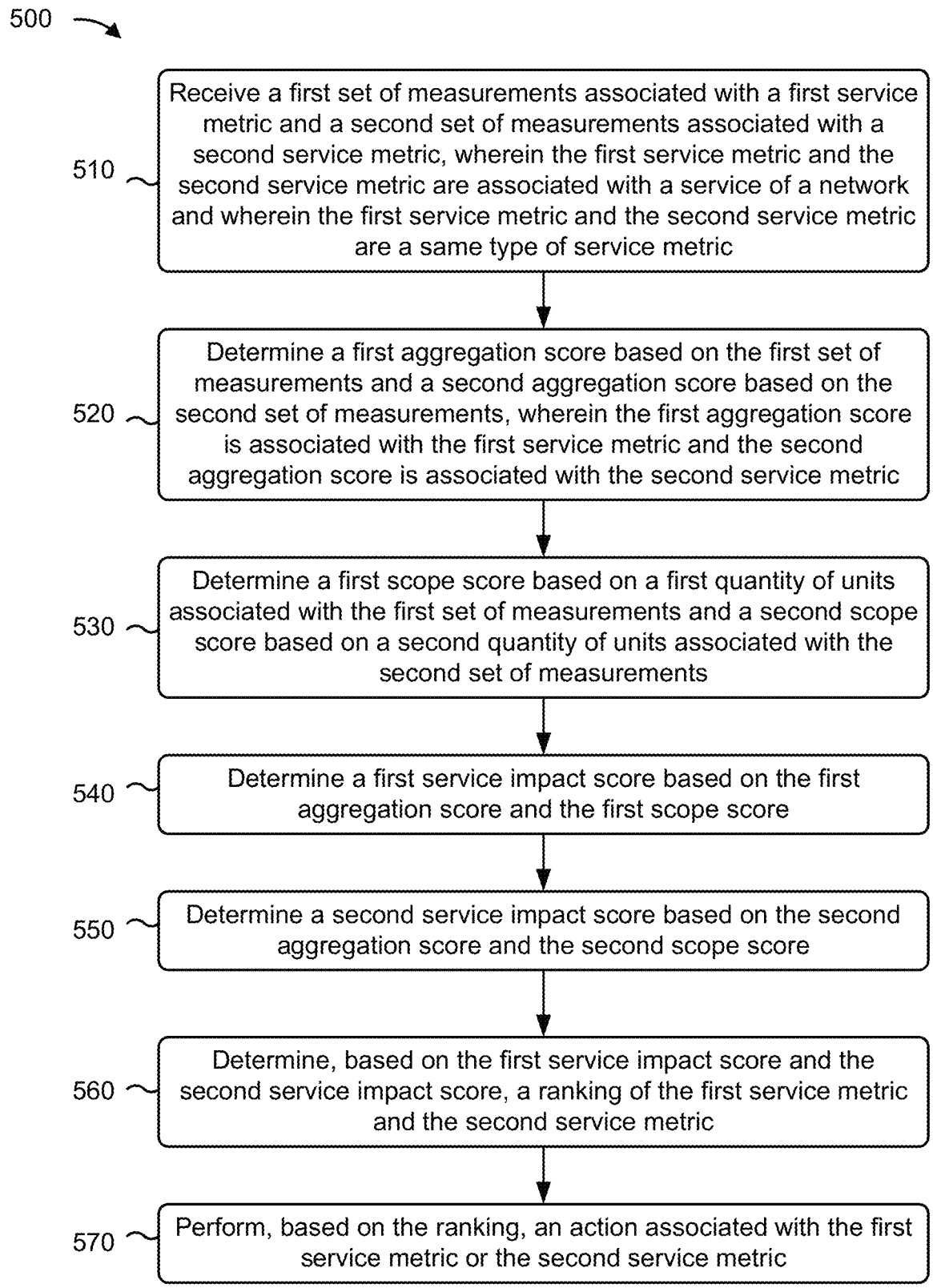

FIG. 5 is a flowchart of an example process 500 for determining a service impact score for a metric according to a scope of the metric. In some implementations, one or more process blocks of FIG. 5 may be performed by a scoring platform (e.g., scoring platform 220). In some implementations, one or more process blocks of FIG. 5 may be performed by another device or a group of devices separate from or including the scoring platform, such as a client device (e.g., client device 210), a network device (e.g., network device 240), a server device (e.g., server device 250), and/or the like.

As shown in FIG. 5, process 500 may include receiving a first set of measurements associated with a first service metric and a second set of measurements associated with a second service metric, wherein the first service metric and the second service metric are associated with a service of a network, and wherein the first service metric and the second service metric are a same type of service metric (block 510). For example, the scoring platform (e.g., using processor 320, memory 330, storage component 340, input component 350, output component 360, communication interface 370 and/or the like) may receive a first set of measurements associated with a first service metric and a second set of measurements associated with a second service metric, as described above. In some implementations, the first service metric and the second service metric are associated with a service of a network. In some implementations, the first service metric and the second service metric are a same type of service metric.

As further shown in FIG. 5, process 500 may include determining a first aggregation score based on the first set of measurements and a second aggregation score based on the second set of measurements, wherein the first aggregation score is associated with the first service metric and the second aggregation score is associated with the second service metric (block 520). For example, the scoring platform (e.g., using processor 320, memory 330, storage component 340, input component 350, output component 360, communication interface 370 and/or the like) may determine a first aggregation score based on the first set of measurements and a second aggregation score based on the second set of measurements, as described above. In some implementations, the first aggregation score is associated with the first service metric and the second aggregation score is associated with the second service metric.

As further shown in FIG. 5, process 500 may include determining a first scope score based on a first quantity of units associated with the first set of measurements and a second scope score based on a second quantity of units associated with the second set of measurements (block 530). For example, the scoring platform (e.g., using processor 320, memory 330, storage component 340, input component 350, output component 360, communication interface 370 and/or the like) may determine a first scope score based on a first quantity of units associated with the first set of measurements and a second scope score based on a second quantity of units associated with the second set of measurements, as described above.

As further shown in FIG. 5, process 500 may include determining a first service impact score based on the first aggregation score and the first scope score (block 540). For example, the scoring platform (e.g., using processor 320, memory 330, storage component 340, input component 350, output component 360, communication interface 370 and/or the like) may determine a first service impact score based on the first aggregation score and the first scope score, as described above.

As further shown in FIG. 5, process 500 may include determining a second service impact score based on the second aggregation score and the second scope score (block 550). For example, the scoring platform (e.g., using processor 320, memory 330, storage component 340, input component 350, output component 360, communication interface 370 and/or the like) may determine a second service impact score based on the second aggregation score and the second scope score, as described above.

As further shown in FIG. 5, process 500 may include determining, based on the first service impact score and the second service impact score, a ranking of the first service metric and the second service metric (block 560). For example, the scoring platform (e.g., using processor 320, memory 330, storage component 340, input component 350, output component 360, communication interface 370 and/or the like) may determine, based on the first service impact score and the second service impact score, a ranking of the first service metric and the second service metric, as described above.

As further shown in FIG. 5, process 500 may include performing, based on the ranking, an action associated with the first service metric or the second service metric (block 570). For example, the scoring platform (e.g., using processor 320, memory 330, storage component 340, input component 350, output component 360, communication interface 370 and/or the like) may perform, based on the ranking, an action associated with the first service metric or the second service metric, as described above.

Process 500 may include additional implementations, such as any single implementation or any combination of implementations described below and/or in connection with one or more other processes described elsewhere herein.

In a first implementation, the first set of measurements are associated with a first network device of the network and the second set of measurements are associated with a second network device of the network. In a second implementation, alone or in combination with the first implementation, the first set of measurements are associated with a first set of client devices that are receiving the service via the network and the second set of measurements are associated with a second set of client devices that are receiving the service via the network.

In a third implementation, alone or in combination with one or more of the first and second implementations, the first set of measurements are associated with a first server device that is providing the service via the network and the second set of measurements are associated with a second server device that is providing the service via the network. In a fourth implementation, alone or in combination with one or more of the first through third implementations, the first set of measurements are associated with a first application associated with the service and the second set of measurements are associated with a second application associated with the service.

In a fifth implementation, alone or in combination with one or more of the first through fourth implementations, the first set of measurements are associated with a first location associated with receiving or providing the service via the network and the second set of measurements are associated with a second location associated with receiving or providing the service via the network.

In a sixth implementation, alone or in combination with one or more of the first through fifth implementations, performing the action comprises at least one of: performing an action associated with the service to reduce a difference between the first service impact score and the second service impact score, or causing a user interface to indicate the ranking.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
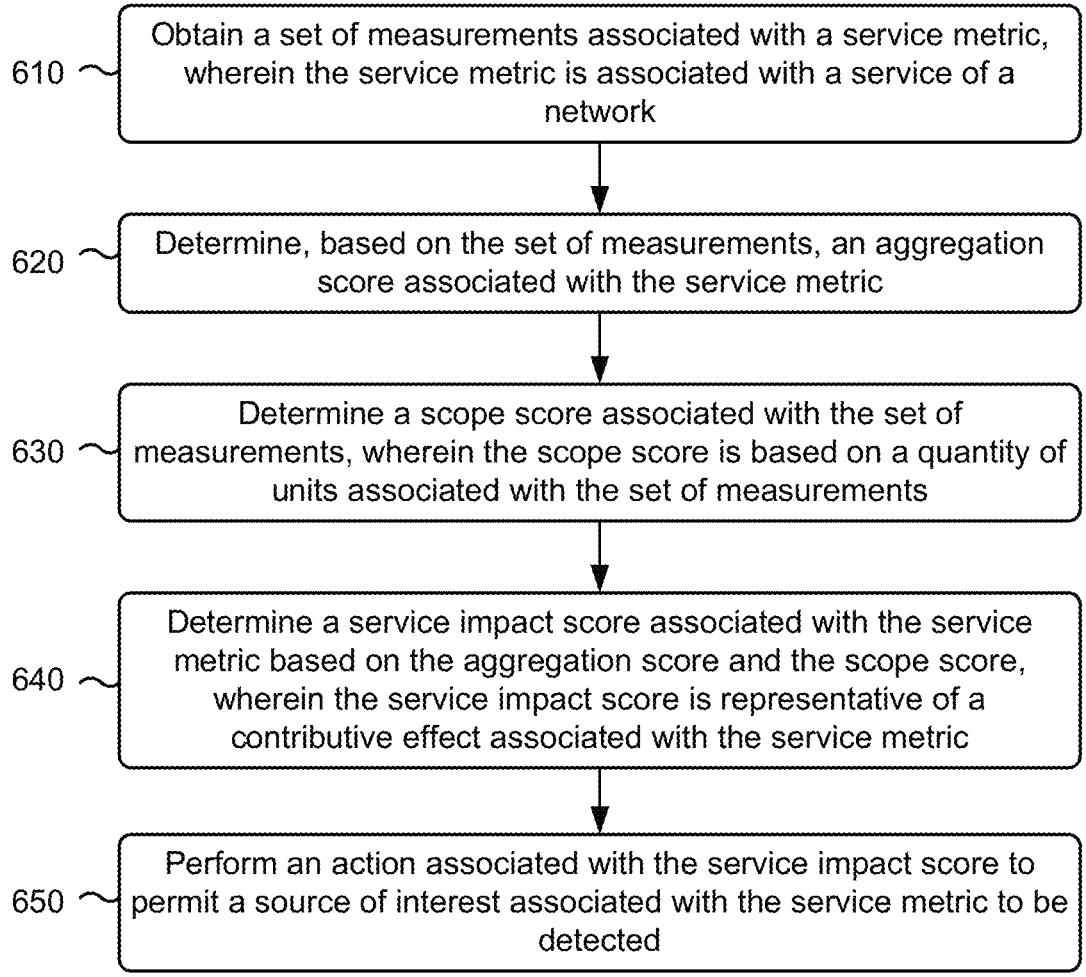

FIG. 6 is a flowchart of an example process 600 for determining a service impact score for a metric according to a scope of the metric. In some implementations, one or more process blocks of FIG. 6 may be performed by a scoring platform (e.g., scoring platform 220). In some implementations, one or more process blocks of FIG. 6 may be performed by another device or a group of devices separate from or including the scoring platform, such as a client device (e.g., client device 210), a network device (e.g., network device 240), a server device (e.g., server device 250), and/or the like.

As shown in FIG. 6, process 600 may include obtaining a set of measurements associated with a service metric, wherein the service metric is associated with a service of a network (block 610). For example, the scoring platform (e.g., using processor 320, memory 330, storage component 340, input component 350, output component 360, communication interface 370 and/or the like) may obtain a set of measurements associated with a service metric, as described above. In some implementations, the service metric is associated with a service of a network.

As further shown in FIG. 6, process 600 may include determining, based on the set of measurements, an aggregation score associated with the service metric (block 620). For example, the scoring platform (e.g., using processor 320, memory 330, storage component 340, input component 350, output component 360, communication interface 370 and/or the like) may determine, based on the set of measurements, an aggregation score associated with the service metric, as described above.

As further shown in FIG. 6, process 600 may include determining a scope score associated with the set of measurements, wherein the scope score is based on a quantity of units associated with the set of measurements (block 630). For example, the scoring platform (e.g., using processor 320, memory 330, storage component 340, input component 350, output component 360, communication interface 370 and/or the like) may determine a scope score associated with the set of measurements, as described above. In some implementations, the scope score is based on a quantity of units associated with the set of measurements.

As further shown in FIG. 6, process 600 may include determining a service impact score associated with the service metric based on the aggregation score and the scope score, wherein the service impact score is representative of a contributive effect associated with the service metric (block 640). For example, the scoring platform (e.g., using processor 320, memory 330, storage component 340, input component 350, output component 360, communication interface 370 and/or the like) may determine a service impact score associated with the service metric based on the aggregation score and the scope score, as described above. In some implementations, the service impact score is representative of a contributive effect associated with the service metric.

As further shown in FIG. 6, process 600 may include performing an action associated with the service impact score to permit a source of interest associated with the service metric to be detected (block 650). For example, the scoring platform (e.g., using processor 320, memory 330, storage component 340, input component 350, output component 360, communication interface 370 and/or the like) may perform an action associated with the service impact score to permit a source of interest associated with the service metric to be detected, as described above.

Process 600 may include additional implementations, such as any single implementation or any combination of implementations described below and/or in connection with one or more other processes described elsewhere herein.

In a first implementation, the service impact score corresponds to a ranking of the service metric relative to a plurality of other service metrics associated with the service. In a second implementation, alone or in combination with the first implementation, the scope score is weighted based on the aggregation score satisfying a threshold.

In a third implementation, alone or in combination with one or more of the first and second implementations, the scoring platform analyzes the set of measurements based on a threshold range and identifies a quantity of measurements of the set of measurements that are within the threshold range, wherein the scope score is determined based on the quantity of measurements in the threshold range satisfying a threshold.

In a fourth implementation, alone or in combination with one or more of the first through third implementations, the contributive effect corresponds to an effect on an end user experience associated with at least one of: a client device associated with receiving the service, a network device associated with providing the service, or a server device associated with providing the service.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software.

As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   obtaining, by a device, a set of measurements associated with a first service metric,
      wherein the first service metric is associated with a service of a network;
   determining, by the device and based on the set of measurements, an aggregation score associated with the first service metric,
      wherein the aggregation score is representative of the first service metric;
   determining, by the device whether the aggregation score exceeds a highest threshold of a plurality of thresholds;
   determining, by the device, only when the aggregation score is determined to exceed the highest threshold, a scope score associated with the aggregation score,
      wherein the scope score is determined based on a quantity of users or devices associated with the set of measurements and a period of time over which the set of measurements was obtained;
   determining, by the device, a service impact score associated with the service metric by combining the aggregation score and the scope score;
   determining, by the device, a ranking of the service metric relative to a second service metric based on the service impact score; and
   performing, by the device, an action associated with the service impact score including determining additional service impact scores for submetrics of the first service metric,
      wherein the submetrics correspond to one or more of:
         particular applications contributing to the first service metric,
         particular locations of the network contributing to the first service metric, or
         particular devices contributing to the first service metric.

2. The method of claim 1, wherein the aggregation score is a first aggregation score, the scope score is a first scope score, and the service impact score is associated with a first network device of the network, and wherein the service impact score is determined based on normalizing the first aggregation score and a second aggregation score based on the first scope score and a second scope score, wherein the second aggregation score and the second scope score are associated with the second service metric, and wherein the second service metric is associated with a second network device of the network that is different from the first network device.

3. The method of claim 1, wherein a type of the first service metric and the second service metric corresponds to at least one of:
- a network-based metric associated with the network,
- a client-based metric associated with a client device that receives the service,
- a server-based metric associated with a server device that provides the service,
- an application-based metric associated with an application that provides the service, or
- a location-based metric associated with a location of receiving the service or a location of providing the service.

4. The method of claim 1, wherein the aggregation score is determined based on an analysis for a type of service metric of the first service metric and the second service metric.

5. The method of claim 1, wherein the aggregation score satisfying the threshold corresponds to the first service metric having a negative performance characteristic.

6. The method of claim 1, wherein the service impact score indicates a contributive effect of the service being provided or received via the network relative to the second service metric.

7. The method of claim 1, wherein performing the action comprises:
performing an action associated with at least one of a client device that receives the service, a server device that provides the service, or the network,
the action modifying at least one of:
the aggregation score,
the scope score, or
the service impact score.

8. The method of claim 1, wherein performing the action comprises at least one of:
causing a user interface to indicate the service impact score, or
indicating, via the user interface, the service impact score relative to other service impact scores for other service metrics associated with the service.

9. A device, comprising:
one or more memories; and
one or more processors communicatively coupled to the one or more memories, configured to:
receive a first set of measurements associated with a first service metric and a second set of measurements associated with a second service metric,
wherein the first service metric and the second service metric are associated with a service of a network, and
wherein the first service metric and the second service metric are a same type of service metric;
determine a first aggregation score based on the first set of measurements and a second aggregation score based on the second set of measurements,
wherein the first aggregation score is associated with the first service metric and the second aggregation score is associated with the second service metric;
determine whether the first aggregation score exceeds a highest threshold of a plurality of thresholds;
determine, only when the first aggregation score is determined to exceed the highest threshold, a first scope score based on a first quantity of users or devices associated with the first set of measurements and a period of time over which the first set of measurements was obtained;
determine a second scope score based on a second quantity of units associated with the second set of measurements;
determine a first service impact score based on combining the first aggregation score and the first scope score;
determine a second service impact score based on the second aggregation score and the second scope score;
determine, based on the first service impact score and the second service impact score, a ranking of the first service metric relative to the second service metric; and
perform, based on the ranking, an action associated with the first service metric or the second service metric,
wherein the one or more processors, when performing the action, are to determine additional service impact scores for submetrics of the first service metric or the second service metric,
wherein the submetrics correspond to one or more of:
particular applications contributing to the first service metric or the second service metric,
particular locations of the network contributing to the first service metric or the second service metric, or
particular devices contributing to the first service metric or the second service metric.

10. The device of claim 9, wherein the first set of measurements are associated with a first network device of the network and the second set of measurements are associated with a second network device of the network.

11. The device of claim 9, wherein the first set of measurements are associated with a first set of client devices that are receiving the service via the network and the second set of measurements are associated with a second set of client devices that are receiving the service via the network.

12. The device of claim 9, wherein the first set of measurements are associated with a first server device that is providing the service via the network and the second set of measurements are associated with a second server device that is providing the service via the network.

13. The device of claim 9, wherein the first set of measurements are associated with a first application associated with the service and the second set of measurements are associated with a second application associated with the service.

14. The device of claim 9, wherein the first set of measurements are associated with a first location associated with receiving or providing the service via the network and the second set of measurements are associated with a second location associated with receiving or providing the service via the network.

15. The device of claim 9, wherein the one or more processors, when performing the action, are configured to at least one of:
perform an action associated with the service to reduce a difference between the first service impact score and the second service impact score, or
cause a user interface to indicate the ranking.

16. A non-transitory computer-readable medium storing instructions, the instructions comprising:
one or more instructions that, when executed by one or more processors, cause the one or more processors to:
obtain a set of measurements associated with a service metric,
wherein the service metric is associated with a service of a network;
determine, based on the set of measurements, an aggregation score associated with the service metric;
determine whether the aggregation score exceeds a highest threshold of a plurality of thresholds;
determine only when the aggregation score is determined to exceed the highest threshold, a scope score associated with the aggregation score,
wherein the scope score is determined based on a quantity of users or devices associated with the set of measurements and a period of time over which the set of measurements was obtained;
determine a service impact score associated with the service metric based on combining the aggregation score and the scope score;
determine a ranking of the service metric relative to a second service metric based on the service impact score; and
perform an action associated with the service impact score to permit a source of interest associated with the service metric to be detected,
wherein the one or more instructions, that cause the one or more processors to perform the action, cause the one or more processors to determine additional service impact scores for submetrics of the service metric,
wherein the submetrics correspond to one or more of:
particular applications contributing to the service metric,
particular locations of the network contributing to the service metric, or
particular devices contributing to the service metric.

17. The non-transitory computer-readable medium of claim 16, wherein the service impact score corresponds to a ranking of the service metric relative to a plurality of other service metrics associated with the service.

18. The non-transitory computer-readable medium of claim 16, wherein the scope score is weighted based on the aggregation score satisfying a threshold.

19. The non-transitory computer-readable medium of claim 16, wherein the one or more instructions, when executed by the one or more processors, further cause the one or more processors to:
analyze the set of measurements based on a threshold range; and
identify a quantity of measurements of the set of measurements that are within the threshold range,
wherein the scope score is determined based on the quantity of measurements in the threshold range satisfying a threshold.

20. The non-transitory computer-readable medium of claim 16, wherein the contributive effect corresponds to an effect on an end user experience associated with at least one of:
a client device associated with receiving the service,
a network device associated with providing the service, or
a server device associated with providing the service.

* * * * *